United States Patent [19]

Lohr, Jr. et al.

[11] 3,865,781

[45] Feb. 11, 1975

[54] N-(DIHYDROCARBYLPHOSPHORODITHIO)IMIDES AS PREMATURE VULCANIZATION INHIBITORS

[75] Inventors: Delmar F. Lohr, Jr.; Edward L. Kay, both of Akron, Ohio

[73] Assignee: The Firestone Tire & Rubber Company, Akron, Ohio

[22] Filed: Aug. 31, 1973

[21] Appl. No.: 393,517

[52] U.S. Cl. .................. 260/45.8 N, 260/45.9 QB, 260/45.9 NC, 260/79.5 B, 260/780
[51] Int. Cl............................................. C08d 11/04
[58] Field of Search............... 260/45.8 N, 780, 940

[56] References Cited
UNITED STATES PATENTS

| | | | |
|---|---|---|---|
| 1,904,934 | 4/1933 | Sibley | 260/780 |
| 2,995,568 | 8/1961 | Malz et al. | 260/940 |
| 3,044,981 | 7/1962 | Malz et al. | 260/940 |
| 3,546,185 | 12/1970 | Yaucher et al. | 260/79.5 B |

FOREIGN PATENTS OR APPLICATIONS 164,670    8/1964    U.S.S.R.............................. 260/780

*Primary Examiner*—Melvyn L. Marquis
*Assistant Examiner*—Gary R. Marshall

[57] ABSTRACT

A method for inhibiting the premature vulcanization of rubber compounds comprising the incorporation in a rubber mix a compound having the formula

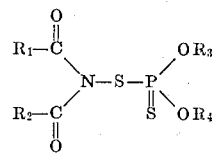

wherein $R_1$ and $R_2$ are aliphatic, cyclic, aromatic hydrocarbon groups or mixtures thereof containing from 1 to 16 carbon atoms and may be interconnected to form a cyclic compound and wherein $R_3$ and $R_4$ are aliphatic, cyclic, aromatic hydrocarbon groups or mixtures thereof containing from 1 to 16 carbon atoms.

8 Claims, No Drawings

N-(DIHYDROCARBYLPHOSPHORODITHIO)IMIDES AS PREMATURE VULCANIZATION INHIBITORS

BACKGROUND OF THE INVENTION

The present invention relates to compounds which inhibit premature vulcanization of rubber compounds or mixes.

Whenever rubber is cured, it is often desirable to utilize compounds which retard any crosslinking of the rubber polymers that may occur during the makeup of the master batch, during storage and the like until the rubber is brought up to a specific temperature cure range. Compounds which prevent such premature vulcanization, often called retarders, generally reduce the rate of crosslinking during actual cure and thereby necessitate increased vulcanization time and hence decrease output of the curing equipment. Example of such retarders are set forth in U.S. Pat. Nos. 3,539,538; 3,546,185; and 3,562,225.

The compounds of the present invention relate to a new class of premature vulcanization inhibiting compounds which retard the start of cure in a rubber mix and also increase the cure rate. Heretofore, such compounds were never used in the rubber compound field although a similar class of compounds, U.S. Pat. No. 2,995,568, have been solely used as pesticides to control flies and spider mites.

SUMMARY OF THE INVENTION

It is, therefore, an object of the present invention to provide a new group of premature vulcanization inhibitors.

It is a further object of the present invention to provide a group of premature vulcanization inhibiting compounds, as above, which retard vulcanization at a specific temperature range.

It is a still further object of the present invention to provide a group of premature vulcanization inhibiting compounds, as above, which increase scorch delay and the crosslinking rate in the vulcanization of rubber mixes.

These and other objects of the present invention are described in detail without attempting to discuss all of the various modifications in which the invention might be embodied; the invention being measured by the appended claims and not by the details of the specification.

In general, a method of inhibiting premature vulcanization in rubber mixes relates to the application to the rubber mix a compound as in the formula

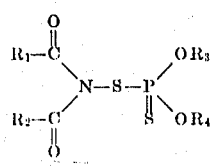

wherein $R_1$, $R_2$, $R_3$, and $R_4$ are aliphatic, cyclic, aromatic hydrocarbon groups or mixtures thereof containing from 1 to 16 carbon atoms and wherein $R_1$ and $R_2$ may be interconnected to form a cyclic compound.

DESCRIPTION OF THE PREFERRED EMBODIMENTS

Compounds of the present invention which inhibit premature vulcanization can generally be classified as N-(dihydrocarbylphosphorodithio) imides. More specifically, these compounds are represented by the formula

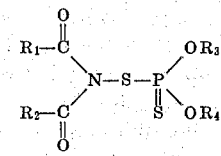

wherein $R_1$ and $R_2$ are aliphatic, cyclic, aromatic hydrocarbon groups or mixtures thereof containing from 1 to about 16 carbon atoms. Moreover, $R_1$ and $R_2$ may be interconnected, that is a portion of a cyclic compound so that together with

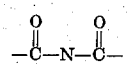

an imide group is formed. $R_3$ and $R_4$ may also be aliphatic, cyclic, aromatic hydrocarbon groups or mixtures thereof containing from 1 to about 16 carbon atoms and preferably from 1 to 10 carbon atoms. Of course, the aliphatic compounds may be branched.

These compounds may be used with any rubber mixture such as for tire tread, tire body, rubber molding, and the like, wherein the rubber mixture contains a sulfur curative system. Generally, the amount of the inhibitor ranges from 0.05% to about 5% based solely upon the rubber compound in the rubber mixture. A more desirable range is from 0.1% to about 1.0%.

The N-(dihydrocarbylphosphorodithio)imide compounds of the present invention can be prepared in an inert solvent such as tetrahydrofuran ambient temperatures and normal pressures as indicated by the following equation

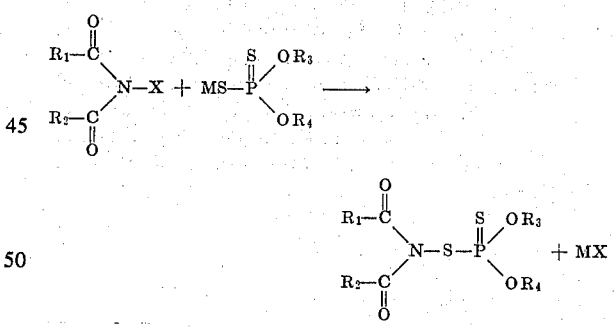

wherein $R_1$, $R_2$, $R_3$, $R_4$ are as set forth above and wherein X is a halogen atom, preferably chlorine or bromine, and M is a group 1A metal ion, preferably sodium or potassium.

Representative examples of N-(dihydrocarbylphosphorodithio)imides which are preferred in the present invention due largely to ease of preparation include:
N-(dimethylphosphorodithio) succinimide
N-(diethylphosphorodithio) succinimide
N-(diisopropylphosphorodithio) succinimide
N-(di-n-octylphosphorodithio) succinimide
N-(di-2-ethylhexylphosphorodithio) succinimide
N-(dicyclohexylphosphorodithio) succinimide
N-(diphenylphosphorodithio) succinimide
N-(ditolylphosphorodithio) succinimide N-(dinaphthylphosphorodithio) succinimide
N-(dimethylphosphorodithio) phthalimide
N-(diethylphosphorodithio) phthalimide
N-(diisopropylphosphorodithio) phthalimide
N-(di-n-octylphosphorodithio) phthalimide
N-(di-2-ethylhexylphosphorodithio) phthalimide
N-(dicyclohexylphosphorodithio) phthalimide
N-(diphenylphosphorodithio) phthalimide
N-(ditolylphosphorodithio) phthalimide and
N-(dinaphthylphosphorodithio) phthalimide Although, the above representative examples set forth the use of the various succinimides, and phthalimides groups, other dicarboximides compounds described by the above formula can also be utilized in the present invention. For example, the various adipimides, glutarimides, maleimides, and naphthalimides may also be used.

The premature vulcanization inhibitors may be used to prevent crosslinking at low or non-curing temperatures of generally any type of rubber mixture containing a rubber compound such as polybutadiene, polystyrenebutadiene rubber, polyisoprene, nitrile rubbers, polyisobutylene, polychloroprene, and the like and various amounts of oil, carbon black, and the like. That is, during any conventional operation such as preparation of a master batch, storage or the lke, the inhibitors will retard the formation of premature vulcanization which often renders processing of the rubber such as for calendering or extruding or shaping a tire, impractical since the occurrance of crosslinking renders the rubber rough and lumpy. Moreover, the present inhibitors have been found to increase scorch delay and unlike prior art retarders, generally do not significantly reduce the cure rate or rate of crosslinking the rubber compound upon actual cure. Long scorch times are desirable not only for safety reasons, but also for quicker or shorter time periods required for optimun cure. Hence, production output on existing curing equipment can be increased. Additionally, the increase crosslinking rate or tighter cure affects the physical properties of the rubber compound as, for example, increasing the elasticity modulus and decreasing the ultimate elongation.

In order to test the effect of the N-(dihydrocarbylphosphorodithio)imides, a styrene/butadiene copolymer rubber mixture was prepared according to the following recipe:

RECIPE FOR A RUBBER MIXTURE

| Compound | Parts by Wt. |
|---|---|
| Styrene/butadiene copolymer | 100 |
| Oil | 45 |
| Carbon black | 70 |
| Zinc Oxide | 2 |
| Stearic acid | 2 |
| Sulfur | 1.7 |
| N-Tert. butyl-2-benzothiazolesulfenamide | 1.4 |
| N-(1,3-Dimethylbutyl)-N'-phenyl-p-phenylenediamine | 1.0 |

The styrene/butadiene copolymer rubber mixture was prepared in a conventional hydrocarbon solvent such as hexane with a alkyllithium initiator. The rubber mixture contained usual or typical amounts of processing oil, carbon black, zinc oxide, stearic acid, sulfur, antioxidant and a sulfenamide accelerator. This rubber mixture was blended and the following amounts of various inhibitors according to the present invention were added as set forth in Table 1. The rubber mixtures were then tested in a Monsanto Rheometer and the time to scorch as well as the rate of the cure were determined. Additionally, the elasticity modulii and the ultimate elongation were also determined and are set forth in Table II.

TABLE 1

| Test Stock Rubber Mix Plus php of: | 1 | 2 | 3 | 4 | 5 | 6 | 7 |
|---|---|---|---|---|---|---|---|
| Sample A | — | 0.2 | — | — | — | — | — |
| Sample B | — | — | 0.2 | — | — | — | — |
| Sample C | — | — | — | — | 0.1 | 0.2 | 0.3 |

Sample A is N-(diethylphosphorodithio)phthalimide.
Sample B is N-(diisopropylphosphorodithio)phthalimide.
Sample C is N-(dicyclohexylphosphorodithio)succinimide.

TABLE II

| Monsanto Rheometer, 300°F, 1° Arc, 100 rpm, Mini Die | 1 | 2 | 3 | 4 | 5 | 6 | 7 |
|---|---|---|---|---|---|---|---|
| Scorch Time, Minutes | 13.6 | 14.1 | 15.3 | 12.2 | 13.3 | 13.4 | 14.3 |
| Time to Optimum (90%) Cure, Minutes | 23.5 | 21.0 | 22.4 | 18.2 | 18.1 | 18.2 | 19.0 |
| Cure Rate Index* | 10.1 | 14.5 | 14.1 | 16.7 | 20.8 | 20.8 | 21.3 |
| Normal Stress-Strain, Cured 23' at 300°F | | | | | | | |
| 300% Modulus, psi | 1160 | 1510 | 1575 | 1350 | 1325 | 1450 | 1325 |
| Ultimate Elongation, % | 605 | 500 | 440 | 540 | 490 | 530 | 500 |
| Tensile, psi | 3160 | 2975 | 2600 | 3050 | 2725 | 3275 | 2775 |

*Cure Rate Index is defined as 100/(Time to Optimum Cure-Scorch Time).

From Table II, it is readily apparent that phthalimide inhibitors A and B gave higher scorch times than the control which did not contain any inhibitor. Also the time required to optimum cure on test stocks 2 and 3 were also lower than the control. Thus, the cure rate index which is defined as 100 divided by the time to optimum cure minus the scorch time was considerably higher for stocks 2 and 3. Considering now test stocks 5, 6 and 7 which contained a succinimide inhibitor, as compared to the control, test stock number 4, the scorch time in these series of tests were also increased and thus the cure rate index was substantially higher.

Considering the stress strain data, for each series of tests, the modulus was generally higher and the elongation was significantly lower than the control stocks. The physical date values are indicative of a tight cure.

It can thus be seen that the disclosed invention carries out the objects of the invention set forth above. As will be apparent to those skilled in the art, many modifications can be made without departing from the spirit of the invention herein disclosed and described, the scope of the invention being limited solely by the scope of the attached claims.

What is claimed is:

1. A method of inhibiting premature vulcanization in rubber compounds comprising applying to rubber compounds selected from the class consisting of polybutadiene, polystryenebutadiene, polyisoprene, nitrile rubbers, and polychloroprene an inhibitor

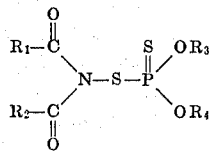

wherein $R_1$ and $R_2$ are aliphatic, cyclic or aromatic hydrocarbon groups or mixtures thereof containing from 1 to about 16 carbon atoms, said $R_1$ and $R_2$ are interconnected and taken together with said

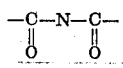

group to form an imide group,
and wherein $R_3$ and $R_4$ are aliphatic, cyclic, or aromatic hydrocarbon groups or mixtures thereof containing from 1 to about 16 carbon atoms, and
said inhibitor ranging from about 0.05% to about 5.0% by weight of said rubber compound.

2. A method of inhibiting premature vulcanization, as in claim 1, wherein said imides are selected from the class consisting of phthalimides, succinimides, adipimides, glutarimides, maleimides, and naphthalimides.

3. A method of inhibiting premature vulcanization as in claim 1, wherein $R_3$ and $R_4$ range from 1 to about 10 carbon atoms.

4. A method of inhibiting premature vulcanization as in rubber compounds comprising applying to rubber compounds selected from the class consisting of polybutadiene, polystyrenebutadiene, polyisoprene, nitrile rubbers, and polychloroprene N-(dihydrocarbylphosphorodithio)imide inhibitors
wherein said imides are selected from the class consisting of phthalimides and succinimides and said inhibitor ranging from about 0.05% to about 5.0% by weight of said rubber compound.

5. A method of inhibiting premature vulcanization as in claim 4, wherein said hydrocarbyl groups have from 1 to about 16 carbon atoms.

6. A vulcanizable composition comprising a rubber compound selected from the class consisting of polybutadiene, polystyrenebutadiene, polyisoprene, nitrile rubbers, and polychloroprene,
a premature vulcanization inhibitor having the formula

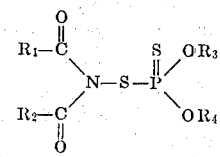

wherein $R_1$ and $R_2$ are aliphatic, cyclic, or aromatic hydrocarbon groups or mixtures thereof containing from 1 to about 16 carbon atoms, said $R_1$ and $R_2$ are interconnected and taken together with said

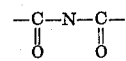

group to form an imide group,
and wherein $R_3$ and $R_4$ are aliphatic, cyclic, or aromatic hydrocarbon groups or mixtures thereof containing from 1 to about 16 carbon atoms, and
said inhibitor ranges from about 0.05% to about 5.0% by weight of said rubber compound.

7. A vulcanizable composition as in claim 6, wherein said imides are selected from the group consisting of phthalimides, succinimides, adipimides, glutarimides, maleimides, and naphthalimides.

8. A vulcanizable composition as in claim 6, wherein $R_3$ and $R_4$ ranges from 1 to about 10 carbon atoms.

* * * * *